United States Patent
Strack

(10) Patent No.: US 8,501,077 B2
(45) Date of Patent: Aug. 6, 2013

(54) PROCESS AND APPARATUS FOR FORMING AN INNER VESSEL LINER FOR A PRESSURE VESSEL

(75) Inventor: Ludger Strack, Heidenrod (DE)

(73) Assignee: GM Global Technology Operations LLC, Detroit, MI (US)

( * ) Notice: Subject to any disclaimer, the term of this patent is extended or adjusted under 35 U.S.C. 154(b) by 229 days.

(21) Appl. No.: 12/815,491

(22) Filed: Jun. 15, 2010

(65) Prior Publication Data

US 2011/0304083 A1  Dec. 15, 2011

(51) Int. Cl.
*B29C 45/14* (2006.01)
(52) U.S. Cl.
USPC .......................................................... 264/515
(58) Field of Classification Search
USPC .......................................................... 264/515
See application file for complete search history.

(56) References Cited

U.S. PATENT DOCUMENTS

| 5,429,845 | A | 7/1995 | Newhouse et al. |
| 2004/0211783 | A1 | 10/2004 | Hunt |
| 2007/0029701 | A1 | 2/2007 | Pechtold et al. |
| 2007/0164461 | A1 | 7/2007 | Wang |
| 2011/0210475 | A1* | 9/2011 | Strack et al. ................. 264/254 |

FOREIGN PATENT DOCUMENTS

| WO | WO9939896 | 8/1999 |
| WO | WO2007079971 A1 | 7/2007 |

* cited by examiner

*Primary Examiner* — Larry Thrower
(74) *Attorney, Agent, or Firm* — Fraser Clemens Martin & Miller LLC; J. Douglas Miller

(57) ABSTRACT

A method and apparatus for forming the vessel is disclosed, the vessel having an injection molded interfacial layer formed on a penetrating element and a filament wound outer shell, the interfacial layer coupled to a blow molded inner shell, wherein a portion of the interfacial layer is coupled to the inner shell to facilitate forming a substantially fluid tight connection therebetween.

17 Claims, 4 Drawing Sheets

PROCESS AND APPARATUS FOR FORMING AN INNER VESSEL LINER FOR A PRESSURE VESSEL

FIELD OF THE INVENTION

The invention relates to a hollow vessel and more particularly to a method and apparatus for forming a hollow pressure vessel having a penetrating element, an inner shell, and an interfacial layer formed on the penetrating element, wherein the interfacial layer facilitates a fluid tight attachment of the penetrating element to the inner shell.

BACKGROUND OF THE INVENTION

Fuel cells have been proposed as a power source for electric vehicles and other applications. In proton exchange membrane (PEM) type fuel cells, hydrogen is supplied as a fuel to an anode of the fuel cell and oxygen is supplied as an oxidant to a cathode of the fuel cell. A plurality of fuel cells is stacked together in a fuel cell stack to form a fuel cell system. The fuel and oxidant are typically stored in pressurized hollow vessels such as fuel tanks, for example, disposed on an undercarriage of the vehicle.

The pressurized vessels may be multi-layered and include at least an inner shell and an outer shell. The inner shell may be formed from a plurality of components welded together. By using a welding process, the types of materials used to form the inner shell are restricted, and permeation of a stored fluid through weldseams of the welded inner shell may result.

Some inner shells are manufactured using a rotational molding method. Typically, the cycle time to prepare an inner shell using the rotational molding method is not optimal. The inner shell is formed utilizing the rotational molding method by disposing penetrating elements in a die cavity with a polymer resin, heating the mold while being rotated to cause the resin to melt and coat walls of the die cavity, cooling the die, and removing the molded inner shell. To form the outer shell, the molded inner shell may undergo a filament winding and curing process.

During the rotational molding, the penetrating elements may not properly adhere to the inner shell resulting in space therebetween. If the penetrating elements are not properly adhered to the inner shell, a fluid tight connection between the penetrating elements and the inner shell may not form. Without a fluid tight connection, the contents of the vessel may escape therefrom to the atmosphere. To ensure fluid tight connections between the penetrating elements and the inner shell, adhesives may be employed. However, insufficient amounts of adhesive and expansion and contraction of the vessel during use may also result in space between the penetrating elements and inner vessel. Heat welding of the penetrating elements and the inner shell, and other similar processes, may be used to form a fluid connection between the inner shell and the penetrating elements. Such welding processes may be time consuming and require non-automatable process steps, thereby resulting in an increased cost to produce the vessel. Heat welding processes are disclosed in U.S. Pat. No. 5,429,845 for BOSS FOR A FILAMENT WOUND PRESSURE VESSEL to Newhouse et al. Alternatively, an adapter device as disclosed in U.S. Pat. No. 7,032,767, hereby incorporated herein by reference in its entirety, may also be used to ensure a fluid-tight seal.

It would be desirable to develop a hollow pressure vessel and efficient method of forming the same having a penetrating element, an inner shell, an outer shell, and an interfacial layer formed on the penetrating element, wherein the interfacial layer facilitates a fluid tight attachment of the penetrating element to the inner shell.

SUMMARY OF THE INVENTION

Concordant and congruous with the present invention, a hollow pressure vessel and efficient method of forming the same having a penetrating element, an inner shell, and an interfacial layer formed on the penetrating element, wherein the interfacial layer facilitates a fluid tight attachment of the penetrating element to the inner shell, has surprisingly been discovered.

In one embodiment, A method of forming a vessel, the method comprises the steps of forming a hollow inner shell from a first moldable material in a die; disposing a penetrating element in the die adjacent the inner shell with a space therebetween; and injection molding a second moldable material into the space between the penetrating element and the inner shell to form an interfacial layer, the interfacial layer forming a substantially fluid tight connection between the penetrating element and the inner shell.

In another embodiment, a method of forming a vessel, the method comprises the steps of blow molding a hollow inner shell formed from a first moldable material in a die; disposing a first penetrating element in the die adjacent the inner shell with a space therebetween; disposing a second penetrating element in the die adjacent the inner shell with a space therebetween; and injection molding a second moldable material into the space between the first penetrating element and the inner shell and between the second penetrating element and the inner shell to form a first interfacial layer and a second interfacial layer, respectively, forming a substantially fluid tight connection between the first penetrating element and the inner shell and the second penetrating element and the inner shell.

In another embodiment, a mold die for forming a hollow vessel comprises a first end portion having a cavity formed therein, the cavity adapted to receive a penetrating element; a second end portion having a cavity formed therein; a first body portion having a cavity formed therein disposed between said first end portion and said second end portion; and a second body portion having a cavity formed therein disposed between said first end portion and said second end portion and adjacent said first body portion, wherein the cavities of said first end portion, said second end portion, said first body portion, and said second body portion cooperate to form a vessel cavity having a shape of the hollow vessel.

DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
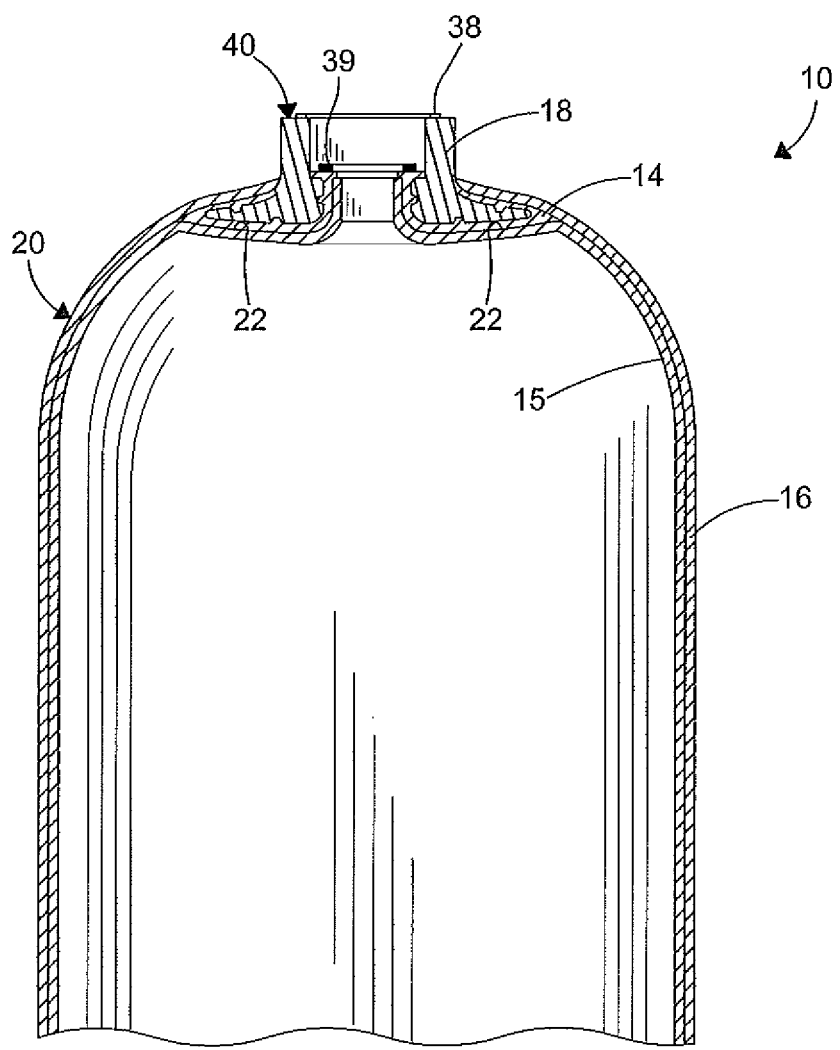
FIG. 1 is a partial cross-sectional view of a vessel according to an embodiment of the invention.
Figure 2:
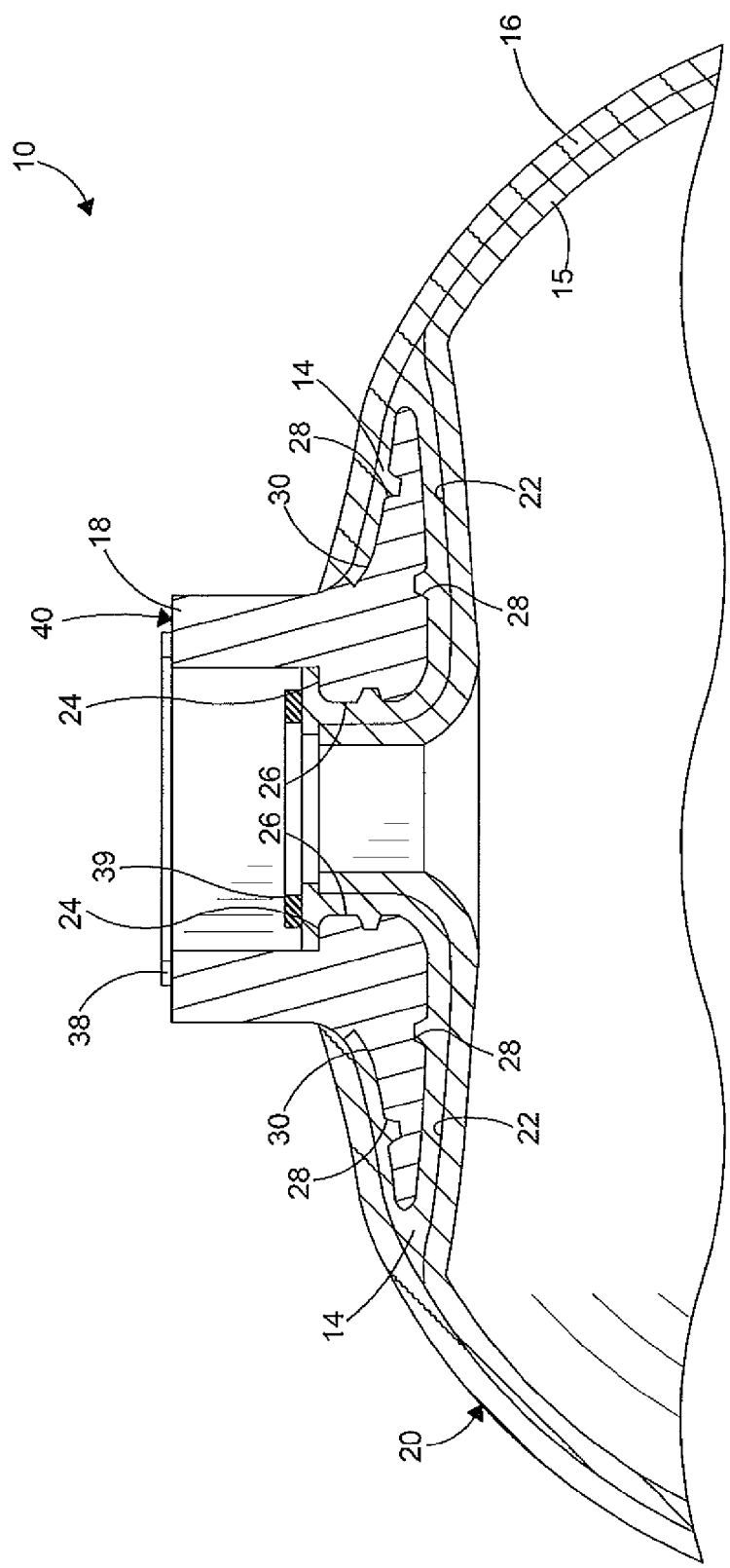
FIG. 2 is an enlarged fragmentary cross-sectional view of the vessel of FIG. 1.

FIGS. 1 and 2 illustrate a hollow pressure vessel 10 having an inner shell 15, an interfacial layer 14, and an outer shell 16. The vessel 10 has a substantially cylindrical shape and is adapted to hold a pressurized fluid (not shown). It is understood that the vessel 10 may have any shape as desired, and the vessel 10 may include additional layers such as a barrier layer, a foil layer, and the like, as desired. Furthermore, the vessel 10 or the inner shell 15 may be coated with a resin, primer, or adhesive to facilitate bonding with additional shells and layers. The pressurized fluid may be any fluid such as a gas such as hydrogen gas, compressed natural gas, and oxygen gas, a liquid, and both a liquid and a gas, for example.

The inner shell 15 of the vessel 10 is a hollow container adapted to store the pressurized fluid. In the embodiment shown, the inner shell 15 has a substantially cylindrical shape. However, the inner shell 15 may have any shape, as desired. A first end of the inner shell 15 forms a bonding seat 22 adapted to abut the interfacial layer 14. The inner shell 15 may form any shape of seat such as a convex seat, a concave seat, or a substantially planar seat, for example. As shown, the inner shell 15 is formed from a thermoplastic, such as polyethylene, PET, polyoxymethylene (POM), ABS/PC, ethylene vinyl alcohol, or a nylon material, for example. The inner shell 15 may also be formed from any moldable material such as a thermoplastic elastomer or a thermosetting plastic, and the like.

The interfacial layer 14 is formed around at least a portion of a vessel penetration element 18, such as a boss, a component of a divided boss, a fitting, an insert, and the like, for example. The interfacial layer 14 is disposed at a first end 20 of the vessel 10 abutting the inner shell 15. As shown in FIGS. 1 and 2, the interfacial layer 14 is formed from a moldable material, such as polyethylene, PET, polyoxymethylene (POM), ABS/PC, ethylene vinyl alcohol, a nylon material, or a fiberglass reinforced thermoplastic, for example. It is understood that the interfacial layer 14 may be formed from any material adapted to adhere to or be integrally formed with the inner shell 15. The interfacial layer 14 may have a gasket 39, such as a polymeric o-ring, for example, disposed on an end thereof adjacent an annular shoulder 24 formed on an inner surface 26 of the penetrating element 18. The gasket 39 is adapted to form a fluid tight connection or seal between the interfacial layer 14 and a means for fluid communication (not shown) with the interior of the vessel 10, such as a valve, a fitting, a hose, a nozzle, a conduit, and the like. The gasket 39 may be any conventional gasket formed from a material which facilitates forming a fluid tight connection between two contacting surfaces. It is understood that the gasket 39 may have any shape, as desired, and the vessel 10 may include a plurality of gaskets 39. The gasket 39 may be formed anywhere on the penetrating element 18 or the gasket 39 may be formed on or with the interfacial layer 22, as desired. It is understood that the interfacial layer may itself be formed in such a way so as to also function as a gasket.

The penetrating element 18 is a separately produced finish that forms an opening into the interior of the vessel 10, and is typically shaped to accommodate a specific closure. The vessel 10 may include any number of penetrating elements, as desired. As shown in FIG. 2, the penetrating element 18 includes the annular shoulder 24 formed on the inner surface 26 thereof. A plurality of indentations 28 is formed on the inner surface 26 and an exterior surface 30 of the penetrating element 18. The indentations 28 are adapted to receive a portion of the interfacial layer 14 therein. The penetrating element 18 may also include an annular groove (not shown) formed on the inner surface 26 thereof adapted to receive a portion of the means for fluid communication with the penetrating element 18 and the interior of the vessel 10. Instead of the groove, the inner surface 26 of the penetrating element 18 may be threaded to receive the means for fluid communication. Accordingly, the penetrating element 18 is formed of a metal or another conventional material having desired properties.

The penetrating element 18 may include a gasket 38, such as a polymeric o-ring, for example, disposed on an end 40 thereof adapted to form a fluid tight connection between the penetrating element 18 and the means for fluid communication with the interior of the vessel 10. The gasket 38 may be any conventional gasket formed of a material which facilitates forming a fluid tight connection between two contacting surfaces.

The outer shell 16 of the vessel 10 is disposed on the inner shell 15. As shown, the outer shell 16 substantially abuts the inner shell 15 and a portion of the interfacial layer 14. A portion of the outer shell 16 is disposed on the penetrating element 18 at the first end 20 of the vessel 10. The outer shell 16 may be formed with a filament winding and curing process. If the outer shell 16 is formed by a filament winding process, the outer shell 16 may be formed from a carbon fiber, a glass fiber, a composite fiber, and a fiber having a resin coating, for example.

Figure 3A:
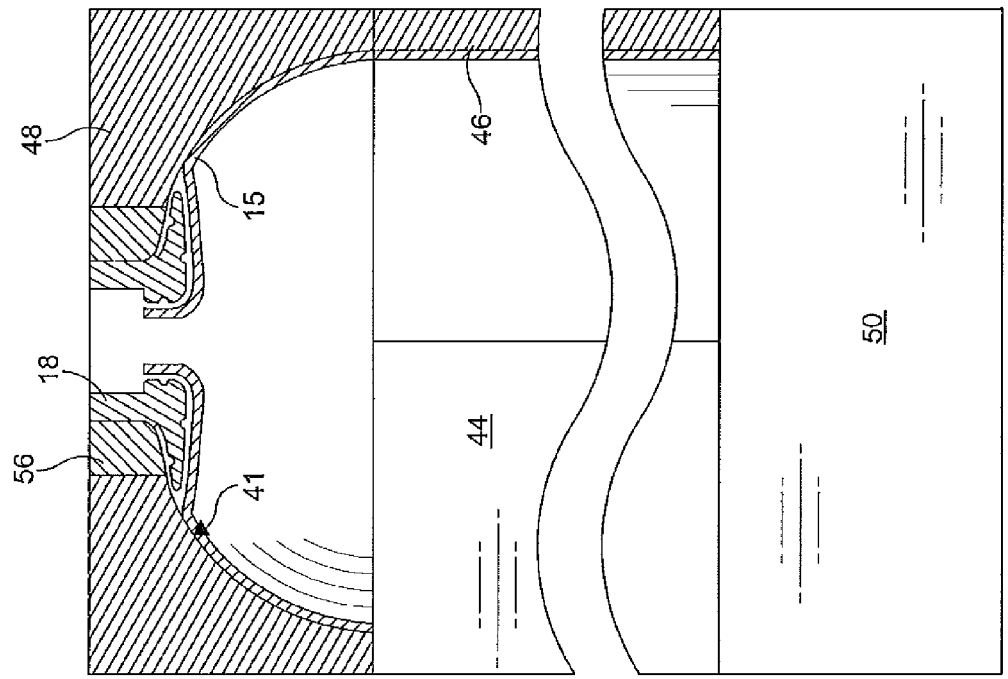
FIG. 3 is a partial cross-sectional view of a mold die for forming the vessel of FIGS. 1 and 2 according to another embodiment of the invention.
Figure 3:
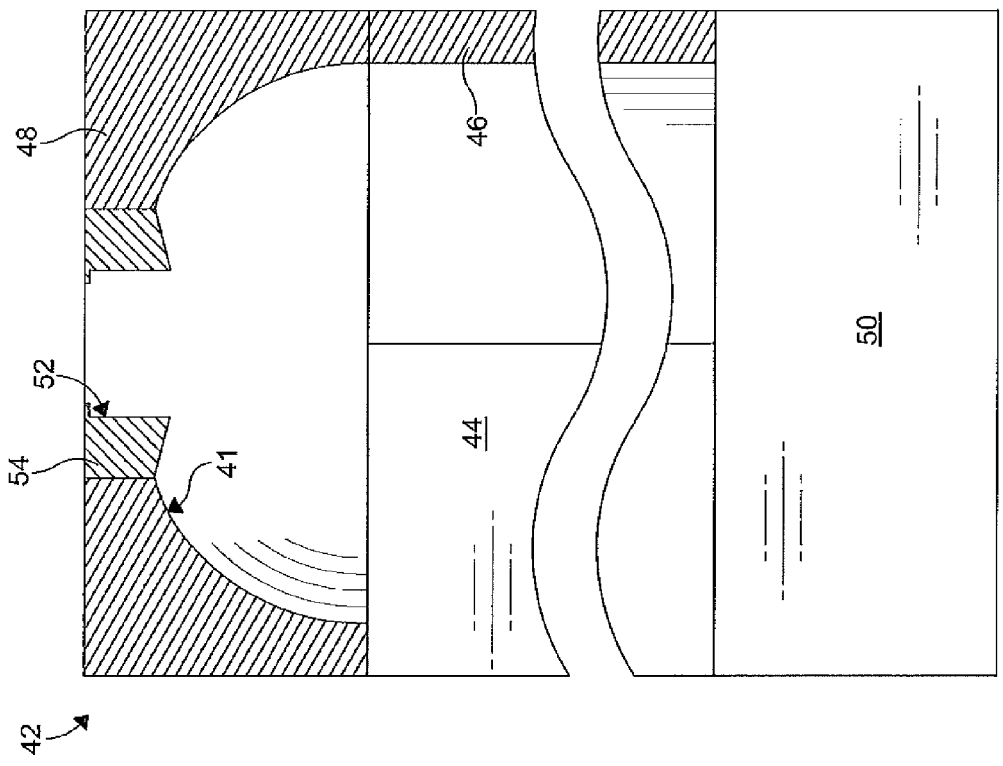

To form the vessel 10, the inner shell 15 is extrusion blow molded in a vessel cavity 41 of a mold die 42 shown in FIG. 3. Unlike a conventional blow molding die which is formed from two cooperating portions, each portion forming half of the mold die cavity, the mold die 42 includes a first body portion 44 and a second body portion 46 disposed intermediate a first end portion 48 and a second end portion 50. Each of the portions 44, 46, 48, 50 include a cavity, the cavities of the portions 44, 46, 48, 50 cooperating to form the vessel cavity 41 of the mold die 42. The first end portion 48 includes a selectively removable blow molding insert 54. The blow molding insert 54 is formed from the same material as the remainder of the mold die 42 and includes a central aperture. The blow molding insert 54 cooperates with the first end portion 48 to form the vessel cavity 41. If the vessel to be formed by the mold die 42 includes a second penetrating element, the cavity formed by the second end portion 50 may also be adapted to receive a penetrating element. It is understood that the portions 44, 46, 48, 50 may have any shape, as desired, and the cavities of the portions 44, 46, 48, 50 may have any shape, as desired.

During the extrusion blow molding process, melted pellets or flakes of a material such as a plastic, for example, are extruded from an extruder through a die head (not shown) into the assembled mold die 42 in the form of a parison (not shown). A pressure fluid (not shown) is then caused to flow through the parison in the mold die 42 causing the parison to expand and contact the inner walls of the mold die 42. As the fluid causes the parison to expand, the parison contacts an inner surface of the mold die 42, thereby taking a shape of the vessel cavity 41 and forming the inner shell 15 of the vessel 10. It is understood that the pressure fluid may be any conventional fluid such as air, nitrogen, or oxygen, as desired. As the inner shell 15 is formed, the material forming the first end 20 thereof abuts the blow molding insert 54. Due to the shape of the blow molding insert 54, which may have any shape as desired, the first end 20 of the inner shell 15 forms a sealing seat adapted to receive the interfacial layer 14 and seal the interfacial layer 14 to the penetrating element 18 and the inner shell 15.

Figure 4:
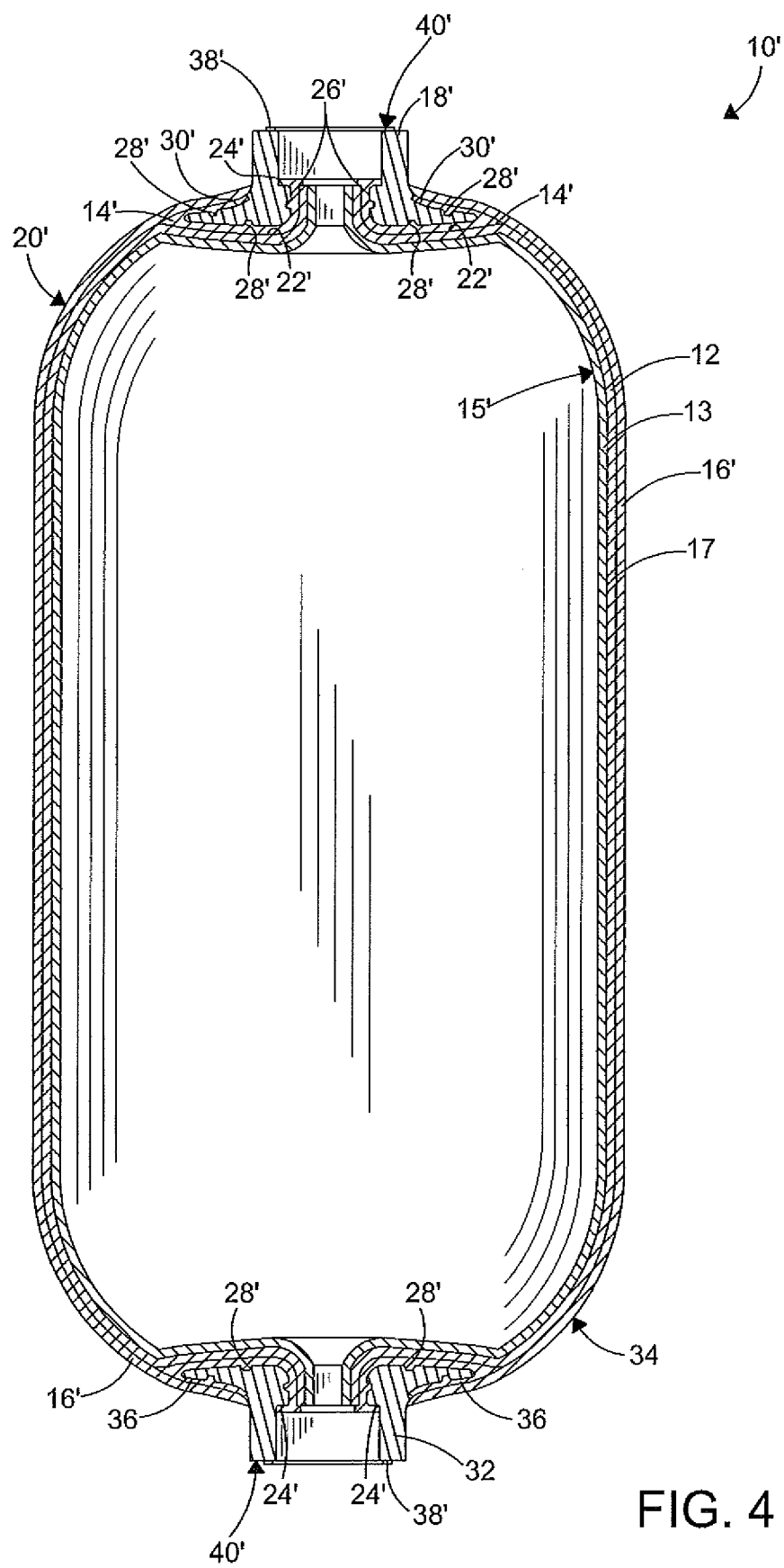
FIG. 4 is a cross-sectional view of a vessel according to another embodiment of the invention.

According to another embodiment of the invention, a vessel 10' having a multi-layer inner shell 15' having a substantially cylindrical shape and formed from a first layer 12 having a substantially smooth outer surface, a barrier layer 17, and a second layer 13 is shown in FIG. 4. However, any number of layers may be used. The hollow pressure vessel 10' is similar to the vessel 10 of FIGS. 1 and 2, except as described below. Similar to the structure of FIGS. 1 and 2, FIG. 4 includes the same reference numerals accompanied by a prime (') to denote similar structure.

The barrier layer 17 of the vessel 10' is disposed between the first layer 12 and the second layer 13. It is understood that the first layer 12 and the second layer 13 may be formed from the same or similar materials. It is further understood that the first layer 12 and the second layer 13 may be formed from different materials or similar materials having different physical properties. However, any number of layers may be used. As a non-limiting example, the barrier layer 17 is formed from a copolymer such as EVOH. As a non-limiting example, the inner shell 15' may include a tie layer (not shown) disposed between at least one of the first layer 12 and the barrier layer 17 and between the second layer 13 and the barrier layer 27. To form the vessel 10' having the multi-layer inner shell 15', a co-extrusion blow molding process as known in the art is utilized.

The vessel 10' further includes a second penetration element 32 attached to a second end 34 thereof. Similar to the penetration element 18 shown in FIGS. 1 and 2 and described herein and the penetration element 18' shown in FIG. 4, the second penetration element 32 is attached to the vessel 10' by a second interfacial layer 36. The interfacial layers 14', 36 are similar to the interfacial layer 14 described herein.

After the inner shell 15 has been formed by the extrusion or co-extrusion blow molding process, the blow molding insert 54 of the first end portion 48 of the mold die 42 is slidably removed therefrom and a selectively removable injection molding insert 56 adapted to receive the penetrating element 18 disposed therein. The injection molding insert 56 is formed from the same material as the blow molding insert 54 and the remainder of the mold die 42 and includes a central aperture. The injection molding insert 56 cooperates with the first end portion 48 to form the vessel cavity 41. As best shown in FIG. 3a, the mold die 42 is closed by positioning the injection molding insert 56 into the first end portion 48 with the penetrating element 18 disposed adjacent a first end of the inner shell 15. A space is formed between the penetrating element 18 and the inner shell 15, and the penetrating element 18 and the mold die 42. The penetrating element 18 may be heated prior to being disposed in the mold die 42 with the injection molding insert 56 to facilitate adhesion to the interfacial layer 14 as it is formed. The interfacial layer 14 is formed by injection of the material forming the interfacial layer 14 into the mold die 42 to fill the space between the penetrating element 18 and the inner shell 15. The material fills the plurality of indentations 28 of the penetrating element 18 and forms around the inner surface 26 and the outer surface 30 of the penetrating element 18 until the annular shoulder 24 is covered by the material. The indentations 28 may be radial indentations formed in the penetrating element 18 so that relative rotation between the penetrating element 18 and the inner shell 18 is mitigated. The interfacial layer 14 contacts the inner shell 15 at the bonding seat 22 and adjacent the opening formed in the inner shell 15. Because the material fills the indentations 28 and covers the annular shoulder 24, removal of the interfacial layer 14 from the penetrating element 18 is mitigated. It is understood that the surfaces of the penetrating element 18 that contact the material forming the interfacial layer 14 may be etched, plasma treated, coated with a primer, or coated with an adhesive prior to the injection molding process to facilitate adhesion of the penetrating element 18 to the material, as desired. In addition to the indentations 28, it is also understood that the penetrating element 18 may include grooves, channels, and/or protuberances adapted to receive a portion of the material to mechanically attach the material to the penetrating element 18. As described herein, the interfacial layer 14 is formed around at least a portion of the penetration element 18, such as a boss, a component of a divided boss, a fitting, an insert, and the like, for example. Furthermore, the interfacial layer 14 may be injection overmolded over a pinch line formed during the blow molding step of the inner shell 15 in the mold die 42, thereby forming a fluid tight connection therebetween. Injection overmolding the interfacial layer 14 over the pinch line is particularly desirable for a multi-layer vessel such as the vessel 10' shown in FIG. 4.

During the injection molding process in the mold die 42 with the injection molding insert 56, the inner shell 15 is pressurized with a fluid to militate against deflection of the walls thereof caused by the pressure exerted by the injection molded plastic material of the interfacial layer 14. The injection pressure of the material may be minimized to further militate against deflection of the walls of the inner shell 15. The injection pressure is typically below the injection pressure of a typical injection molding process, such as below 500 bar, for example. It is understood that the inner shell 15 may be formed in a first blow molding die (not shown), allowed to solidify, and then moved to a separate injection molding die to form the interfacial layer 14. By using the first blow molding die and the injection molding die, a complexity of each machine and die used to form the vessel 10 is minimized.

By forming the penetrating element 18 with the interfacial layer 14 and forming the interfacial layer 14 on or adhering the interfacial layer 14 to the inner shell 15, the penetrating element 18 is not formed with or adhered directly to the inner shell 15. By adhering the interfacial layer 14 to the inner shell 15, a plastic-on-plastic connection is formed rather than a metal-on-plastic connection of the penetrating element 18 and the inner shell 15, as known in the art. Because the interfacial layer 14 is coupled to the inner shell 15, a fluid tight connection therebetween could be achieved. Furthermore as shown in FIGS. 1 and 2, since the penetrating element 18 and the interfacial layer 14 are disposed on an exterior of the inner shell 15 after the inner shell 15 is formed, a range of geometry of the inner shell 15 and a range of geometry of an aperture of the inner shell 15 in fluid communication with the interior of the vessel 10 is possible.

Once the interfacial layer 14 has cooled, the mold die 42 is opened by separating the portions 44, 46, 48, 50, and the inner shell 15 coupled to the interfacial layer 14 and to the penetrating element 18 is removed. The outer shell 16 is typically formed around the inner shell 15 with a filament winding and curing process. It is understood that the outer shell 16 may be applied by spraying a coating, or by sewing a leather or fabric material onto the interfacial layer 14 and the inner shell 15. The inner shell 15 and interfacial layer 14 may be disposed in an automated filament winding apparatus (not shown) for application of the outer shell 16 using a typical filament winding and curing process, as known in the art.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of forming a vessel, the method comprising the steps of:
   extrusion blow molding a hollow inner shell from a first moldable material in a die;
   disposing a penetrating element in the die adjacent an exterior surface of a first end of the inner shell, a space formed between the penetrating element and the exterior surface of the first end of the inner shell; and
   injection molding a second moldable material into the space between the penetrating element and the exterior surface of the first end of the inner shell to form an interfacial layer, the interfacial layer forming a substantially fluid tight connection between the penetrating element and the inner shell.

2. The method of claim 1, wherein the blow molding process is a co-extrusion blow molding process.

3. The method of claim 1, wherein the inner shell is pressurized during the injection molding step.

4. The method of claim 1, wherein the moldable material forming the interfacial layer is a fiberglass reinforced thermoplastic injection molded over a pinch line of the inner shell.

5. The method of claim 1, wherein the interfacial layer includes a gasket disposed thereon adapted to form a substantially fluid tight connection between the interfacial layer and a means for fluid communication with the interior of the inner shell.

6. The method of claim 1, wherein the interfacial layer functions as a gasket adapted to form a substantially fluid tight connection between the interfacial layer and a means for fluid communication with the interior of the inner shell.

7. The method of claim 1, wherein the penetrating element includes at least one of a groove, a channel, radial indentations, and an indentation adapted to receive a portion of the moldable material of the interfacial layer.

8. The method of claim 1, further comprising the step of disposing a second penetrating element in the die adjacent the inner shell with a space therebetween.

9. The method of claim 8, further comprising the step of injection molding another moldable material into the space between the second penetrating element and the inner shell to form a second interfacial layer forming a substantially fluid tight connection between the second penetrating element and the inner shell.

10. The method of claim 1, further comprising the steps of providing a first insert having a desired shape and a central aperture formed therein and inserting the first insert into a cavity of the die prior to the blow molding step.

11. The method of claim 10, further comprising the steps of providing a second insert having a desired shape and a central aperture formed therein adapted to receive a penetrating element and replacing the first insert with the second insert subsequent to the blow molding step and prior to the injection molding step.

12. A method of forming a vessel, the method comprising the steps of:
   extrusion blow molding a hollow inner shell formed from a first moldable material in a die;
   disposing a first penetrating element in the die adjacent an exterior surface of a first end of the inner shell, a first space formed between the first penetrating element and the exterior surface of the first end of the inner shell;
   disposing a second penetrating element in the die adjacent an exterior surface of a second end of the inner shell, a second space formed between the second penetrating element and the exterior surface of the second end of the inner shell; and
   injection molding a second moldable material into the first space between the first penetrating element and the exterior surface of the first end of the inner shell and the second space between the second penetrating element and the exterior surface of the second end of the inner shell to form a first interfacial layer and a second interfacial layer, respectively, forming a substantially fluid tight connection between the first penetrating element and the inner shell and the second penetrating element and the inner shell.

13. The method of claim 12, wherein the inner shell is pressurized during the injection molding step.

14. The method of claim 12, wherein the first interfacial layer includes a gasket disposed thereon adapted to form a substantially fluid tight connection between the first interfacial layer and a means for fluid communication with the interior of the inner shell.

15. The method of claim 12, wherein the moldable materials forming the first interfacial layer and the second interfacial layer are fiberglass reinforced thermoplastics injection molded over pinch lines of the inner shell.

16. The method of claim 12, wherein the inner shell is formed in a first die and the interfacial layers are injection molded in a second die.

17. The method of claim 12, wherein the inner shell and interfacial layers are formed in the same die.

* * * * *